United States Patent [19]
Hwang

[11] Patent Number: 6,051,958
[45] Date of Patent: Apr. 18, 2000

[54] APPARATUS AND METHOD FOR CHARGING RECHARGEABLE BATTERY USING CHARGE CHARACTERISTIC OF TWO-WAY PAGER

[75] Inventor: Seon-Woong Hwang, Suwon-shi, Rep. of Korea

[73] Assignee: Samsung Electronics Co., Ltd., Rep. of Korea

[21] Appl. No.: 09/207,301

[22] Filed: Dec. 8, 1998

[30] Foreign Application Priority Data

Dec. 8, 1997 [KR] Rep. of Korea ........................ 97-66594

[51] Int. Cl.⁷ .......................... H01M 10/44; H01M 10/46
[52] U.S. Cl. ............................................. 320/161; 320/162
[58] Field of Search ..................................... 320/106, 128, 320/135, 152, 157, 159, 161, 162, 148, 156

[56] References Cited

U.S. PATENT DOCUMENTS

| | | | |
|---|---|---|---|
| 4,746,852 | 5/1988 | Martin | 320/106 |
| 4,910,103 | 3/1990 | Yoshikawa et al. | 429/61 |
| 5,153,496 | 10/1992 | LaForge | 320/119 |
| 5,543,702 | 8/1996 | Pfeiffer | 320/110 |

*Primary Examiner*—Edward H. Tso
*Attorney, Agent, or Firm*—Dilworth & Barrese

[57] ABSTRACT

An apparatus and method is provided for charging a rechargeable battery in a two-way pager. The pager has a transmitter, a main battery for supplying a main power source voltage, and the rechargeable battery for supplying a transmission power source voltage to the transmitter. The apparatus includes: a memory for storing a charge start voltage and a charge stop voltage; a charger for boosting the main power source voltage of the main battery to a driving voltage, detecting a voltage of the rechargeable battery, charging the rechargeable battery by boosting the main power source voltage of the main battery to a charge voltage in response to a charge start control signal, and terminating the charging of the rechargeable battery in response to a charge stop control signal; and a controller for receiving the driving voltage and the detected voltage, supplying the charge start control signal to the charger when the detected voltage is less than the charge start voltage, and supplying the charge stop control signal to the charger when the detected voltage is greater than the charge stop voltage.

9 Claims, 5 Drawing Sheets

APPARATUS AND METHOD FOR CHARGING RECHARGEABLE BATTERY USING CHARGE CHARACTERISTIC OF TWO-WAY PAGER

BACKGROUND OF THE INVENTION

1. Field of the Invention

The present invention relates to two-way pagers and, more particularly, to an apparatus and method for efficiently charging a rechargeable or secondary battery of a two-way pager.

2. Description of the Related Art

A conventional two-way pager includes a main or primary battery for supplying a power source voltage to each element of the pager except a transmitter, and a rechargeable or secondary battery for supplying a power source voltage to only the transmitter. An alkaline battery of 1.5V is generally used as the primary battery, and a nickel-cadmium (Ni—Cd) battery of 3.6V is generally used as the secondary battery. The rechargeable battery of 3.6V consists of 3 cells each having 1.2V and constitutes a constant current source as an alternating current (AC) adaptor in order to supply a power source voltage to a mobile telecommunication terminal.

FIGS. 1A and 1B are graphs respectively illustrating discharge and charge efficiency of the rechargeable battery in the two-way pager with respect to a charge input (or charge ratio). FIG. 1C is a graph illustrating charge and discharge voltages of the rechargeable battery in the two-way pager with respect to a charge input.

As shown in FIG. 1B, the charge efficiency is satisfactory between the charge ratios of 25% and 100%. However, if the charge ratio is over 100%, the charge efficiency does not increase, but rather, rapidly decreases. The point at which the rechargeable battery voltage drops after a charge input of 120% is denoted as a full charging index.

The way in which sufficient charging is performed per unit cell is important. For example, in order to prevent overcharging of the rechargeable battery or a memory effect, full charging and full discharging processes are repeated. To this end, a charger having a microprocessor is employed. The point at which full charging has been achieved is referred to as the cut-off power source voltage. That is, the change $\Delta V$ in a cell voltage is about 20 mV on a charge voltage curve 20, as shown in FIG. 1C. In order for the charger to fully charge the secondary battery, a charge current of 140%–160% or more of the rechargeable battery's capacity should be applied.

In a mobile terminal such as a cellular phone, since an AC power source is used as the charger, the rechargeable battery is not significantly affected with respect to charge efficiency. However, since a two-way pager employing a Ni—Cd battery for supplying a power source voltage to a transmitter charges the Ni—CD battery by using a replaceable primary battery instead of an AC adaptor, the charge efficiency and lifetime of the rechargeable battery are reduced.

SUMMARY OF THE INVENTION

It is therefore an object of the present invention to provide a charging apparatus and method for maximizing the charge efficiency of a secondary battery in a two-way pager. The apparatus and method rely upon a charge characteristic of the two-way pager, which uses a primary battery as a main power source as well as for charging the rechargeable battery.

In one aspect of the invention, there is provided an apparatus for charging a rechargeable battery in a two-way pager. The pager has a transmitter, a main battery for supplying a main power source voltage, and the rechargeable battery for supplying a transmission power source voltage to the transmitter. The apparatus includes: a memory for storing a charge start voltage and a charge stop voltage; a charger for boosting the main power source voltage of the main battery to a driving voltage, detecting a voltage of the rechargeable battery, charging the rechargeable battery by boosting the main power source voltage of the main battery to a charge voltage in response to a charge start control signal, and terminating the charging of the rechargeable battery in response to a charge stop control signal; and a controller for receiving the driving voltage and the detected voltage, supplying the charge start control signal to the charger when the detected voltage is less than the charge start voltage, and supplying the charge stop control signal to the charger when the detected voltage is greater than the charge stop voltage.

In another aspect of the invention, there is provided a method for charging a rechargeable battery in a two-way pager. The pager has a memory for storing a charge start voltage and a charge stop voltage. The method includes the steps of: measuring a voltage of the rechargeable battery and comparing the measured voltage with the charge start voltage; generating a charge enable signal to charge the rechargeable battery, when the measured voltage is less than the charge start voltage; measuring the voltage of the rechargeable battery, when the rechargeable battery is being charged; and generating a charge disable signal to stop charging the rechargeable battery, when the measured voltage is greater than the charge stop voltage.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Various preferred embodiments of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions are not described in detail so as not to obscure the present invention.

Figure 1A:
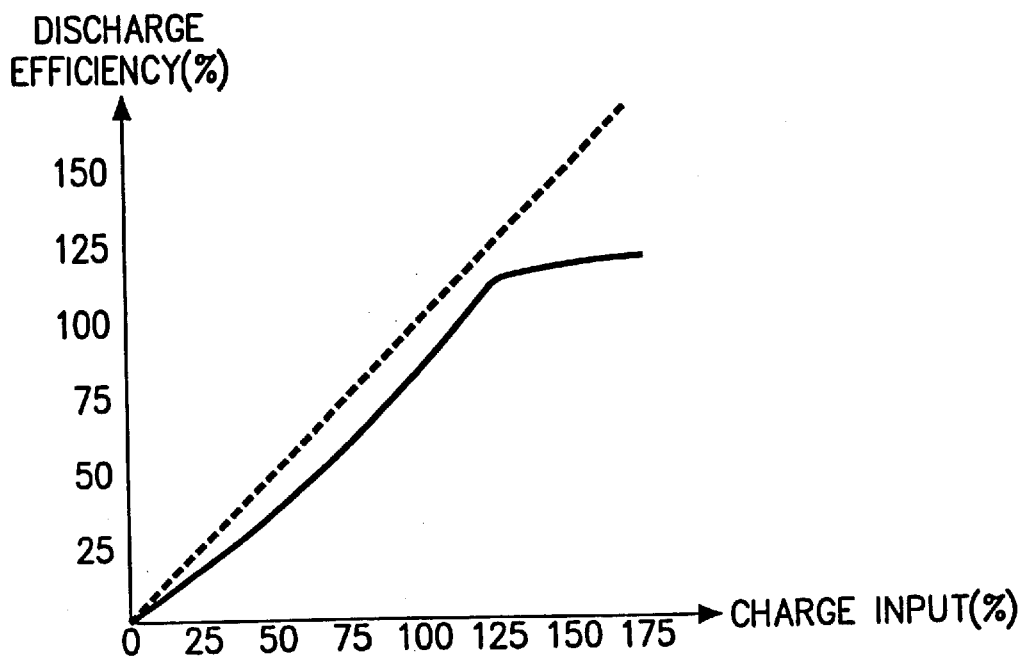
FIG. 1A is a graph illustrating the discharge efficiency of a rechargeable battery in a two-way pager with respect to a charge input.
Figure 1B:
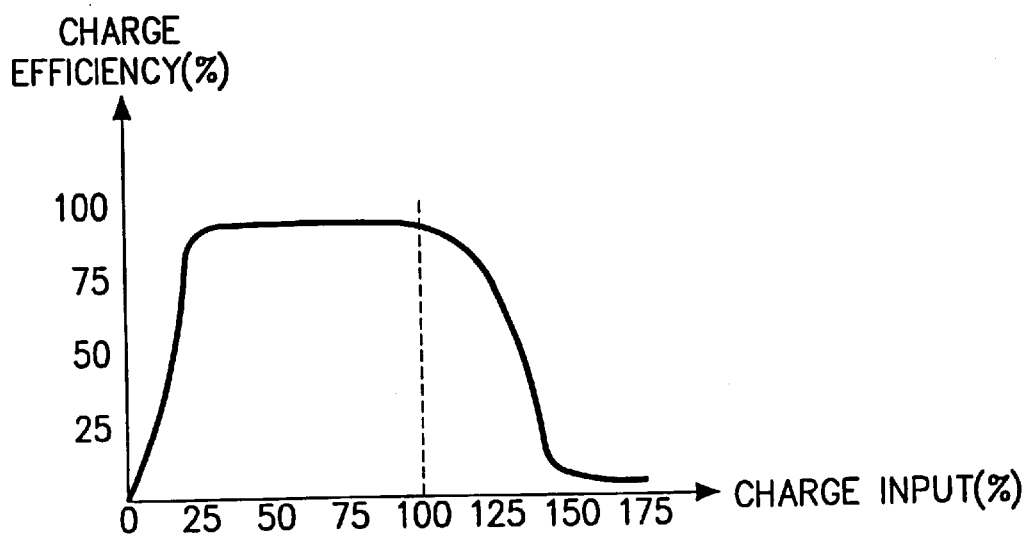
FIG. 1B is a graph illustrating the charge efficiency of the rechargeable battery in a two-way pager with respect to a charge input.
Figure 1C:
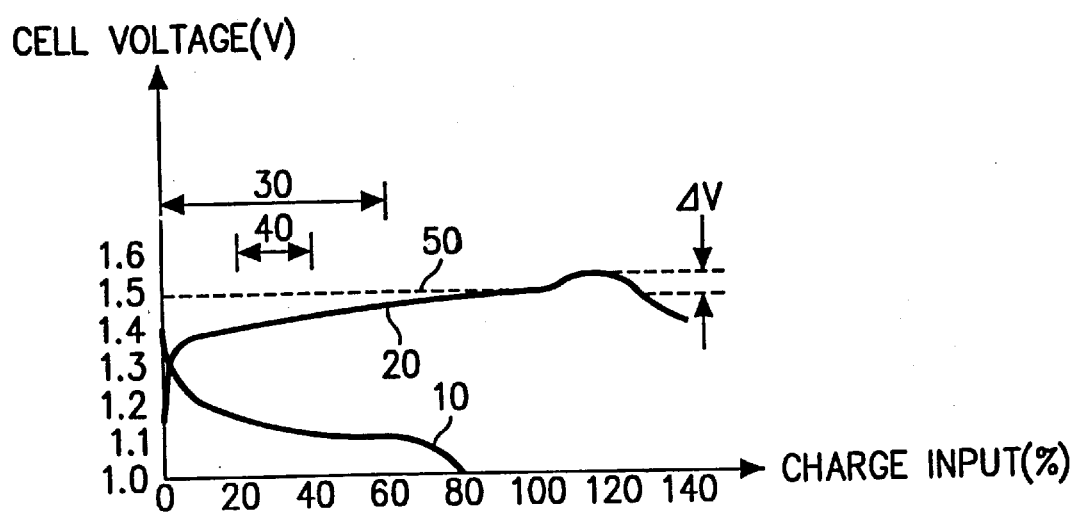
FIG. 1C is a graph illustrating charge and discharge voltages of a rechargeable battery in a two-way pager with respect to a charge input.

FIG. 1B is a graph illustrating charge efficiency of a rechargeable battery in a two-way pager with respect to a charge input (or charge ratio), and FIG. 1C is a graph illustrating charge and discharge voltages of the rechargeable battery in the two-way pager with respect to a charge input. According to the present invention, a charge input of 25%–100%, which represents satisfactory charge efficiency, is used. In each transmitting operation performed by the two-way pager, a current of a few hundred milliamperes is consumed for a few seconds. Therefore, even if only 80% of the capacity is maintained, no problems should arise with respect to normal operation. In the present invention, an interval 40 on a discharge voltage curve 10 is used instead of an interval 30. During interval 40, compensation can be done with only 100% of the instantaneously used capacity. Hence, interval 40 on discharge voltage curve 10 should be previously set in the two-way pager. This interval varies according to the type, capacity and discharge current of the rechargeable battery. Therefore, it is necessary to place the battery in a discharge state by using a circuit of an applicable terminal in order to determine the point of maximum capacity having an efficiency of almost 100%, that is, a voltage at a region 50. Generally, the charge voltage corresponding to region 50 is 6V. The cut-off voltage used during a charging operation is set on the basis of the voltage at region 50, and a charge start voltage on the discharge voltage curve 10 is set to 1.1V.

Figure 2:
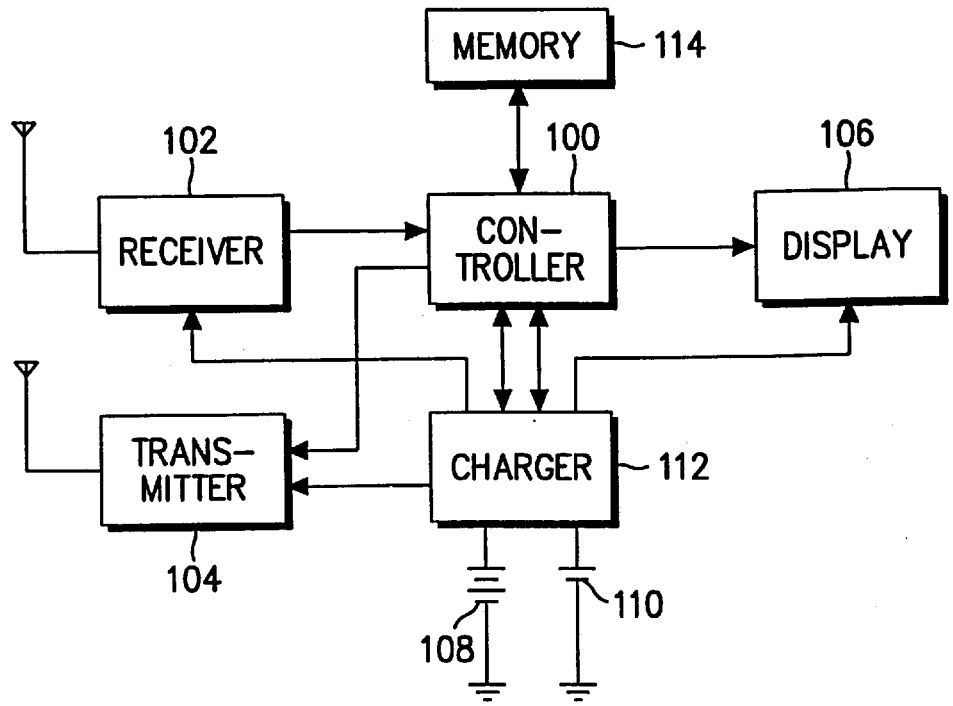
FIG. 2 is a block diagram of a two-way pager to which the present invention is applicable.

Referring to FIG. 2, a two-way pager to which the present invention is applicable includes a controller 100 operatively coupled to a receiver 102, a transmitter 104, a display 106, a rechargeable or secondary battery 108, a main or primary battery 110, a charger 112, and a memory 114. The charger is also operatively coupled to receiver 102, transmitter 104, and display 106. The receiver is operated by a power source voltage of main battery 110. The transmitter 104 is operated by a power source voltage of rechargeable battery 108.

The memory 114 has a ROM (Read Only Memory) for storing an operating program of the pager, a RAM (Random Access Memory) for temporarily storing data generated during the execution of the operating program, and an EEPROM (Electrically Erasable and Programmable Read Only Memory). The memory 114 also stores a charge start voltage and a charge stop voltage (i.e., cut-off voltage). The charger 112 has a charge enable terminal for receiving charge enable and disable signals and boosts the power source voltage of main battery 110 to a driving voltage. The charger 112 supplies the driving voltage to receiver 102 and display 106 and measures a voltage of rechargeable battery 108. The charger 112 boosts the power source voltage of main battery 110 to a charge voltage to charge rechargeable battery 108. The charge voltage is 6V which is the boosted voltage of 1.5V of main battery 110. The controller 100 receives the driving voltage generated from charger 112. The controller 100 also receives the measured voltage from charger 112 to compare the measured voltage with the charge start voltage. If the measured voltage is less than the charge start voltage stored in memory 14, then controller 100 supplies the charge enable signal to the charge enable terminal of charger 112. The controller 100 compares the measured voltage with the charge stop voltage stored in memory 114. If the measured voltage is greater than the charge stop voltage, then controller 100 supplies the charging disable signal to the charge enable terminal of charger 112 to stop charging rechargeable battery 108.

Figure 3:
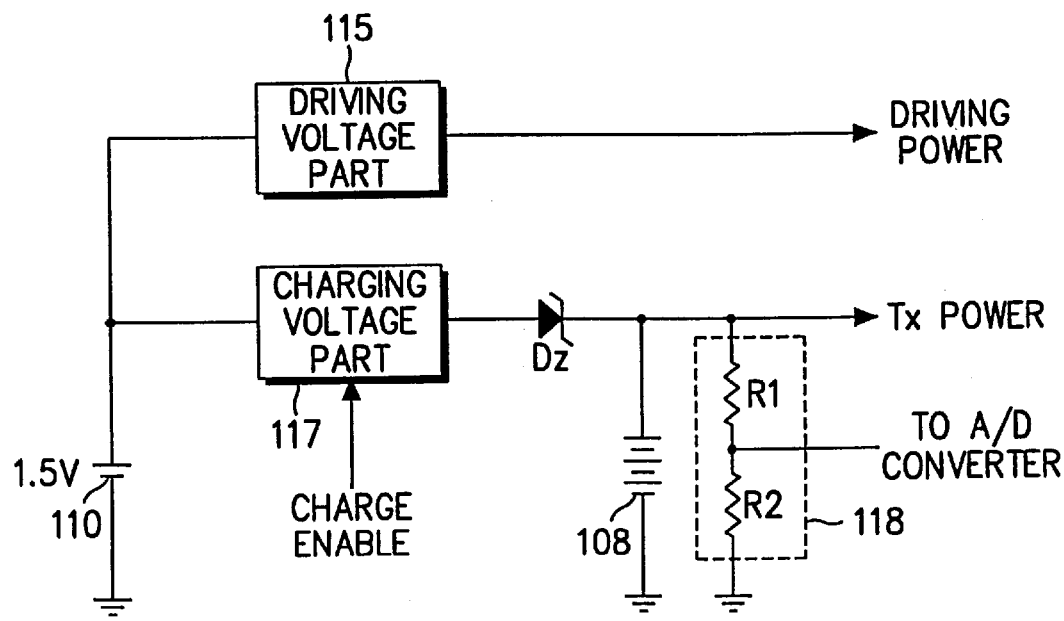
FIG. 3 is a block diagram of a charger according to a preferred embodiment of the present invention.

FIG. 3 is a detailed block diagram of charger 112 according to a preferred embodiment of the present invention. The charger 112 includes a driving voltage part 115, a charging voltage part 117, a detector 118, and a Zener diode Dz. The driving voltage part 115 boosts the voltage of 1.5V of main battery 110 to the driving voltage of 3V and supplies the driving voltage to each element of the pager (except the transmitter). The charging voltage part 117 boosts the voltage of 1.5V of main battery 110 to the charge voltage of 6V to charge rechargeable battery 108. The detector 118, consisting of first and second resistors R1 and R2, detects a voltage of rechargeable battery 108 and supplies the detected voltage to an analog/digital (A/D) converter of controller 100. The Zener diode Dz cuts off a reverse current flowing into charging voltage part 117 from rechargeable battery 108.

Figure 4:
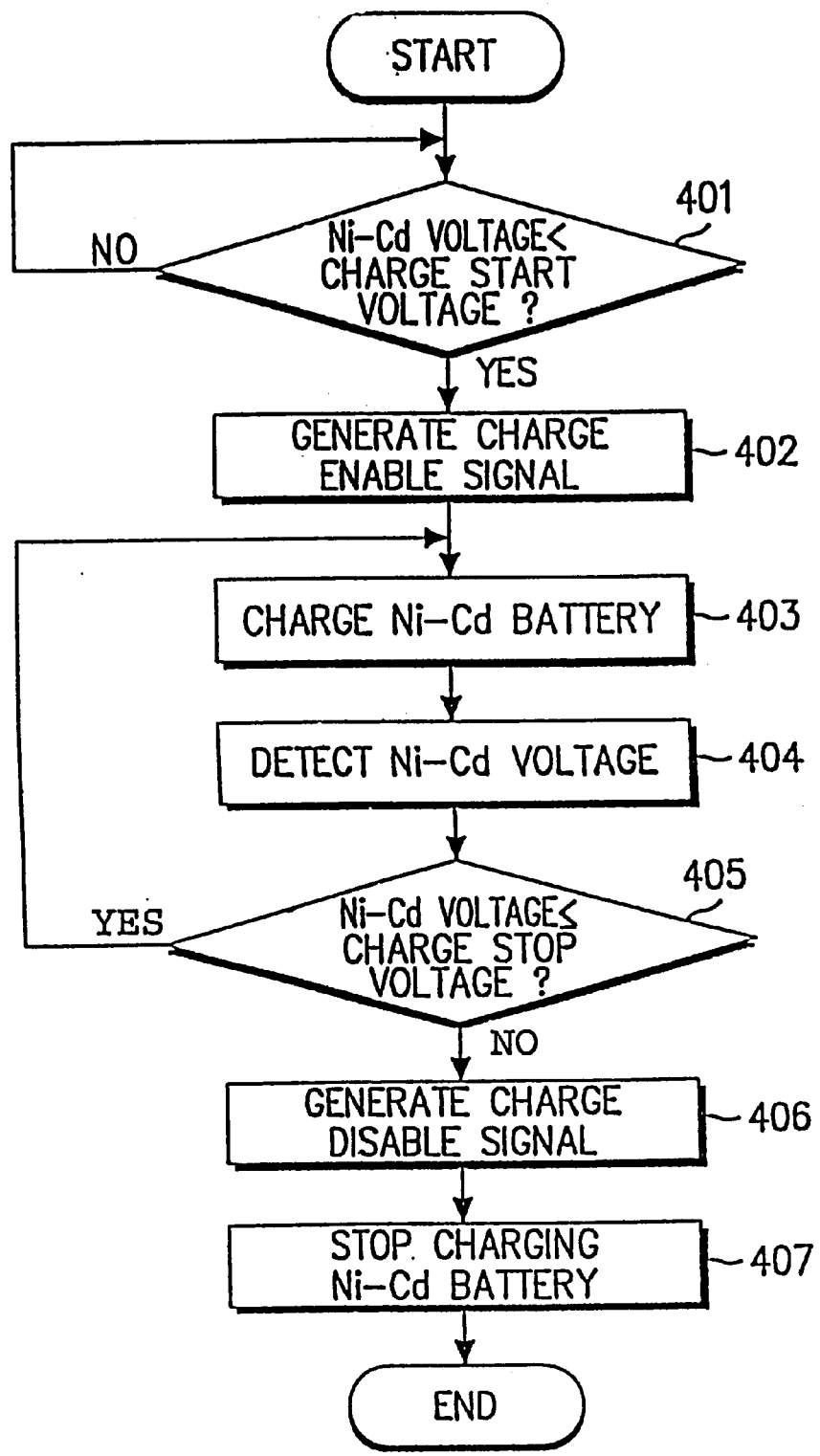
FIG. 4 is a flow chart illustrating a charging process using a charge characteristic of a two-way pager according to a preferred embodiment of the present invention.

FIG. 4 is a flow chart illustrating a charging process using a charge characteristic of the two-way pager according to a preferred embodiment of the present invention. The controller 100 causes detector 118 to detect a Ni—Cd voltage of rechargeable battery 108 and then, controller 100 checks whether or not the Ni—Cd voltage is less than the charge start voltage (step 401). The charge start voltage is 1.1V, which corresponds to a voltage at 40% of the charge input on the discharge voltage curve 10 shown in FIG. 1C. If the Ni—Cd voltage is less than the charge start voltage, then controller 100 supplies the charge enable signal to charging voltage part 117 of charger 112 to operate charging voltage part 117 (step 402). The controller 100 causes charging voltage part 117 to boost the power source voltage of 1.5V of primary battery 110 to the charge voltage of 6V, thereby charging rechargeable battery 108 (step 403). While Ni—Cd battery 108 is charged, controller 100 causes detector 118 to detect the Ni—Cd voltage of rechargeable battery 108 (step 404). The controller 100 checks whether or not the Ni—Cd voltage is less than or equal to the charge stop voltage (step 405). If the Ni—Cd voltage is less than or equal to the charge stop voltage, then the process returns to step 403 to continue charging the rechargeable battery. However, if the Ni—Cd voltage is not less than or equal to the charge stop voltage, then controller 100 supplies the charging disable signal to charging voltage part 117 (step 406), thereby stopping the charging of rechargeable battery 108 (step 407).

Figure 5:
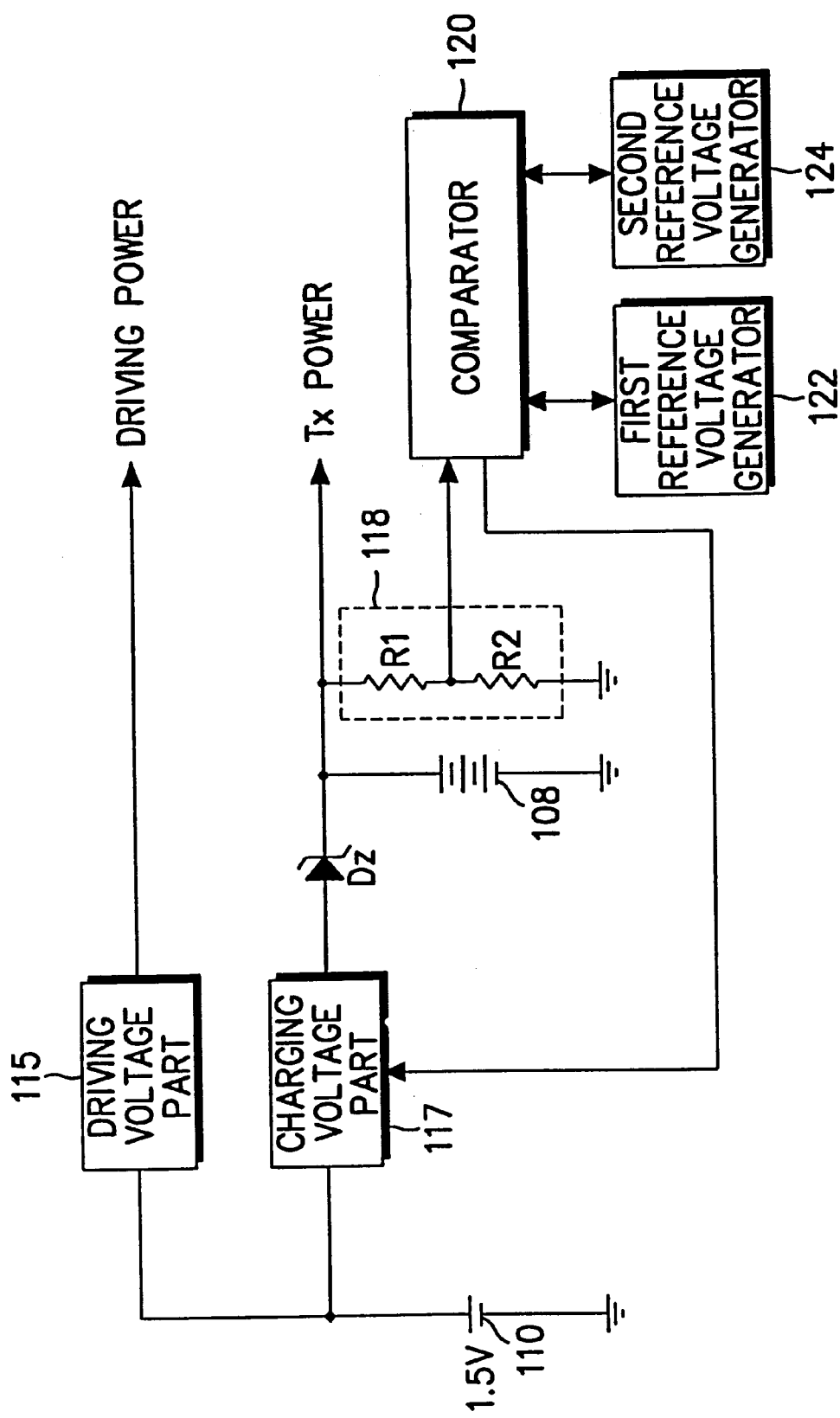
FIG. 5 is a block diagram of a charger according to another preferred embodiment of the present invention.

FIG. 5 is a block diagram of charger 112 according to another preferred embodiment of the present invention. The charger includes a comparator 120 and first and second reference voltage generators 122 and 124 which, together, serve as controller 100. The charger also includes driving voltage part 115, charging voltage part 117 and detector 118 shown in FIG. 3.

The first and second reference voltage generators 122 and 124 provide a charge start reference voltage and a charge stop reference voltage, respectively. The detector 118 detects the voltage of rechargeable battery 108. The comparator 120 receives the voltage detected from detector 118 and compares the detected voltage with the charge start reference voltage. If the detected voltage is less than the charge start reference voltage generated from first reference voltage generator 122, then comparator 120 supplies the charge enable signal to the charge enable terminal of charging voltage part 117. The charging voltage part 117 receives the charge enable signal from comparator 120 and boosts the power source voltage of primary battery 110 to the charge voltage, thereby charging rechargeable battery 108. The comparator 120 also compares the voltage detected from detector 118 with the charge stop reference voltage generated from second reference voltage 124. If the detected voltage is greater than the charge stop reference voltage, then comparator 120 supplies the charging disable signal to the charge enable terminal of charging voltage part 117 to stop charging rechargeable battery 108. The Zener diode Dz cuts off the reverse current flowing into charging voltage part 117 from rechargeable battery 108.

As described previously, charging and discharging are performed using a charge characteristic of the two-way pager. The lifetime of the battery can be increased by maximizing the charge/discharge efficiency of the primary and secondary batteries.

While the invention has been shown and described herein with reference to various preferred embodiments thereof, it will be understood by those skilled in the art that various changes in form and details may be made thereto without departing from the spirit and scope of the invention as defined by the appended claims.

What is claimed is:

1. An apparatus for charging a rechargeable battery in a two-way pager, the pager having a transmitter, a main battery for supplying a main power source voltage, and the rechargeable battery for supplying a transmission power source voltage to the transmitter, said apparatus comprising:
    a memory for storing a charge start voltage and a charge stop voltage;
    a charger for boosting the main power source voltage of the main battery to a driving voltage, detecting a voltage of the rechargeable battery, charging the rechargeable battery by boosting the main power source voltage of the main battery to a charge voltage in response to a charge start signal, and terminating the charging of the rechargeable battery in response to a charge stop control signal, wherein an interval between said charge start voltage and said charge stop voltage being set so that a charge input of 25%–100% is used; and
    a controller for receiving the driving voltage and the detected voltage, supplying the charge start control signal to said charge when the detected voltage is less than the charge start voltage, and supplying the charge stop signal to said charger when the detected voltage is greater than the charge stop voltage.

2. The apparatus as claimed in claim 1, wherein said charger comprises:
    a detector for detecting the voltage of the rechargeable battery and supplying the detected voltage to said controller; and
    a charging voltage part for boosting the main power source voltage of the main battery to the charge voltage in response to the charge start control signal received through a charge enable terminal of said charging voltage part and supplying the charge voltage to the rechargeable battery.

3. The apparatus as claimed in claim 2, further comprising a driving voltage generator for boosting the main power source voltage of the main battery to the driving voltage and supplying the driving voltage to each element of the pager except the transmitter.

4. An apparatus for charging a rechargeable battery in a two-way pager, the pager having a transmitter, the rechargeable battery for supplying a transmission power source voltage to the transmitter and a main battery for supplying a power source voltage to elements of the pager except the transmitter, said apparatus comprising:
    a first reference voltage generator for generating a charge start reference voltage, said charge start reference voltage being set so that a charge input is 25%–100%;
    a second reference voltage generator for generating a charge stop reference voltage, said charge stop reference voltage being set so that a charge input is 25%–100%;
    a detector for detecting a voltage of the rechargeable battery;
    a charging voltage part for boosting the power source voltage of the main battery to a charge voltage in response to a charge enable signal received through a charge enable terminal of the charging voltage part and supplying the charge voltage to the rechargeable battery; and
    a comparator for receiving the detected voltage from said detector, supplying the charge enable signal to the charge enable terminal of said charging voltage part when the detected voltage is less than the charge start reference voltage to start charging the rechargeable battery, and supplying a charging disable signal to the charge enable terminal of said charging voltage part when the detected voltage is greater than the charge stop reference voltage to stop charging the rechargeable battery.

5. The apparatus as claimed in claim 4, further comprising a driving voltage part for boosting the main power source voltage of the main battery to the driving voltage and supplying the driving voltage to each element of said apparatus except the transmitter.

6. The apparatus as claimed in claim 4, further comprising:
    a Zener diode connected between the rechargeable battery and said charging voltage part, for cutting off a reverse current flowing into said charging voltage part from the rechargeable battery.

7. A method for charging a rechargeable battery in a two-way pager having a memory for storing a charge start voltage and a charge stop voltage, said method comprising the steps of:
    measuring a voltage of the rechargeable battery and comparing the measured voltage with the charge start voltage;
    generating a charge enable signal to charge the rechargeable battery, when the measured voltage is less than the charge start voltage;
    measuring the voltage of the rechargeable battery, when the rechargeable battery is being charged; and
    generating a charge disable signal to stop charging the rechargeable battery, when the measured voltage is greater than the charge stop voltage;
    wherein an interval between said charge start voltage and said charge stop voltage being set so that a charge input of 25%–100% is used.

8. An apparatus for charging a rechargeable battery in a two-way pager, the pager having a transmitter, a main battery for supplying a main power source voltage, and the rechargeable battery for supplying a transmission power source voltage to the transmitter, said apparatus comprising:
    a memory for storing a charge start voltage and a charge stop voltage;
    a detector for detecting the voltage of the rechargeable battery and supplying the detected voltage to a controller;
    a driving voltage generator for boosting the main power source voltage of the main battery to a driving voltage and supplying the driving voltage to each element of the pager except the transmitter;
    a charging voltage part for boosting the main power source voltage of the main battery to a charge voltage in response to a charge start signal received through a charge enable terminal of said charging voltage part, supplying the charge voltage to the rechargeable battery, and terminating the charging of the rechargeable battery in response to a charge stop control signal; and a controller for receiving the driving voltage and the detected voltage, supplying the charge start control signal to said charge when the detected voltage is less than the charge start voltage, and supplying the charge stop signal to said charger when the detected voltage is greater than the charge stop voltage.

9. An apparatus for charging a rechargeable battery in a two-way pager, the pager having a transmitter, the rechargeable battery for supplying a transmission power source voltage to the transmitter and a main battery for supplying a power source voltage to elements of the pager except the transmitter, said apparatus comprising:

a first reference voltage generator for generating a charge start reference voltage;

a second reference voltage generator for generating a charge stop reference voltage;

a detector for detecting a voltage of the rechargeable battery;

a driving voltage part for boosting the main power source voltage of the main battery to a driving voltage and supplying the driving voltage to each element of said apparatus except the transmitter;

a charging voltage part for boosting the power source voltage of the main battery to a charge voltage in response to a charge enable signal received through a charge enable terminal of the charging voltage part and supplying the charge voltage to the rechargeable battery; and a comparator for receiving the detected voltage from said detector, supplying the charge enable signal to the charge enable terminal of said charging voltage part when the detected voltage is less than the charge start reference voltage to start charging the rechargeable battery, and supplying a charging disable signal to the charge enable terminal of said charging voltage part when the detected voltage is greater than the charge stop reference voltage to stop charging the rechargeable battery.

* * * * *